United States Patent
Sonnenberg

(12) 
(10) Patent No.: US 6,523,023 B1
(45) Date of Patent: Feb. 18, 2003

(54) METHOD SYSTEM AND COMPUTER PROGRAM PRODUCT FOR DISTRIBUTED INTERNET INFORMATION SEARCH AND RETRIEVAL

(75) Inventor: Glen Sonnenberg, Santa Clara, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 09/401,172

(22) Filed: Sep. 22, 1999

(51) Int. Cl.[7] .............................................. G06F 7/20
(52) U.S. Cl. ........................ 707/3; 707/10; 707/100; 707/101; 709/203; 709/217; 709/219
(58) Field of Search .............................. 707/3, 10, 100, 707/101, 203, 217, 219

(56) References Cited

U.S. PATENT DOCUMENTS

| | | | |
|---|---|---|---|
| 5,864,846 A | 1/1999 | Voorhees et al. ............... | 707/5 |
| 5,867,706 A | 2/1999 | Martin et al. | |
| 6,085,176 A * | 7/2000 | Woolston ..................... | 705/37 |
| 6,275,820 B1 * | 8/2001 | Navin-Chandra et al. ...... | 707/3 |

OTHER PUBLICATIONS

ProFusion, How to form your query to get the best search results, Copyright 1996, <http://web.archive.org/19981202000627/www.profusion.com/help.html>.*

Liu, Guide to Meta–Search Engines, Last Update Jun. 1999, <http://www.indiana.edu/~librcsd/search/meta.html>.*

* cited by examiner

*Primary Examiner*—Kim Vu
*Assistant Examiner*—Hung Pham
(74) *Attorney, Agent, or Firm*—Silicon Valley IP Group, LLC; Kevin J. Zilka; Christopher J. Hamaty

(57) ABSTRACT

A method for searching the Internet is provided that includes generating search criteria for an Internet search utilizing a first search agent that is resident on a first computer, distributing search tasks related to the Internet search to other search agents that are resident on their computers, utilizing the other search agents to perform the distributed search tasks, and then reporting the results of each search task back to the first search agent. In a preferred embodiment, the other search agents also retrieve the results of their distributed search tasks, so that the search results may be more easily accessed by the person that initiated the search. In an embodiment, the computers that host the search agents have connections to a common intranet and the search tasks are distributed only to search agents that have been identified as being available to support Internet searching. The distribution of search tasks may include the use of intelligent algorithms that optimize the quality of the search while minimizing the impact on the search agent computers and the intranet to which they are connected.

1 Claim, 5 Drawing Sheets

METHOD SYSTEM AND COMPUTER PROGRAM PRODUCT FOR DISTRIBUTED INTERNET INFORMATION SEARCH AND RETRIEVAL

FIELD OF THE INVENTION

The present invention relates generally to the search and retrieval of desired information on a data network, and more particularly relates to the search and retrieval of desired information on the Internet.

BACKGROUND OF THE INVENTION

The rapid growth of the Internet has created a global computer network that contains enormous amounts of information. The distribution of information throughout the Internet is supported by services such as FTP, News, Gopher, and the World Wide Web (or the Web as it is referred to hereafter). The Web is the most well known distribution service and the amount of information available on Web pages expands and changes daily.

Because of the enormous amount of information on the Internet, it is becoming increasingly difficult to effectively and efficiently search and retrieve information that is of particular interest. One common way to search and retrieve information from the Internet is by utilizing a commercial search engine, such as Excite or Alta Vista, to generate a list of Internet sites containing the desired information, and then retrieving the desired information from the identified Internet sites. While this method may work for its intended purpose, the user must interact with the search engine and relevant Internet sites at the time the search and retrieval is performed. In addition, if the user is connected to the Internet with a relatively slow connection, retrieving search results may consume the resources of the user's computer for substantial periods of time, thereby preventing the computer from being used for any other tasks during the retrieval process.

In order to assist a user to search the Internet in a more effective and efficient manner, intelligent searching applications have emerged in which Internet searching is more automated. Generally speaking, intelligent searching applications, sometimes referred to as intelligent search agents, bots, or simply agents, include programs that gather information on some regular schedule without the immediate presence of the user required. Using parameters provided by the user, an intelligent searching application searches all or some part of the Internet, gathers the information of interest, and presents it to the user on a daily or other periodic basis. For example, a user may create a profile that is utilized by an intelligent searching application to locate information on the Internet that fits the profile. The intelligent searching application may also manage the search in the background, so that the user is free to perform other tasks. An exemplary intelligent search application according to the prior art is a shareware program called Web Bandit. More information about Web Bandit may be fount at HYPERLINK, http://www.jwsg.com, the contents of which are hereby incorporated by reference as of the filing date of the present disclosure. More information about intelligent searching applications in general may be found at HYPERLINK, http://www.botspot.com, the contents of which are hereby incorporated by reference as of the filing date of the present disclosure. Although intelligent searching applications may simplify Internet searching for the user, they may impact the performance of the user's computer.

For example, while the intelligent searching application is operating in the background, the performance of other applications on the user's computer may decline. In addition, the user must still download searched information in order to have access to the information at a desktop computer.

Although there may be performance degradation during a searching operation, there is more significant performance degradation during the retrieval, or downloading of information from the Internet. During the retrieval of information from the Internet, many of the resources of a desktop computer (e.g., processor, input/output, system bus, and hard disk) are being utilized. When large amounts of information, such as video files, are being downloaded from the Internet, the resources of a desktop computer may be completely consumed.

Although an intelligent searching application may consume resources of the computer on which the search is initiated, in most network environments, such as in a typical corporate enterprise network, the internal operation within one desktop computer does not effect the operation of other desktop computers. Moreover, it is common in a corporate enterprise network that the network resources are not at substantial utilization levels at all times. For example, desktop computers and enterprise servers are not in constant use throughout a workday and typically experience lower levels of use during non-work hours (e.g., nights and weekends). Because the computer resources of the network are not at substantial utilization levels at all times, a substantial amount of computing capacity goes unused.

In view of the enormous amount of information that is available on the Internet, the emergence of intelligent searching applications, and the resource distribution and consumption patterns within typical enterprise networks, it would be desirable to provide a method for searching the Internet and retrieving the results of the search that increases the speed and efficiency with which searches and retrievals are performed while also distributing the consumption of computer resources.

SUMMARY OF THE INVENTION

In a preferred embodiment, a method for searching the Internet is provided that includes generating search criteria for an Internet search utilizing a first search agent that is resident on a first computer, distributing search tasks related to the Internet search to other search agents that are resident on other computers, utilizing the other search agents to perform the distributed search tasks, and then reporting the results of each search task back to the first search agent. In a preferred embodiment, the other search agents also retrieve the of their distributed search tasks, so that the search results may be more easily accessed by the person that initiated the search. In an embodiment, the computers that host the search agents have connections to a common intranet and the search tasks are distributed only to search agents that have been identified as being available to support Internet searching. The distribution of search tasks may include the use of intelligent algorithms that optimize the quality of the search while minimizing the impact on the search agent computers and the intranet to which they are connected.

In a preferred embodiment, Internet search agents (ISAs) are applications, residing on computers such as desktop computers, that are available to manage Internet searches. The ISAs generate search criteria that may include, for example, the type of information that should be searched for (e.g., as identified by keywords), where the search should be conducted (e.g., specific Web sites), the timing of the search (e.g., immediate, nighttime, weekends etc.), and/or the frequency of the search (e.g., hourly, daily, weekly, etc.).

After the search criteria is generated, an initiating ISA identifies whether or not there are any other ISAs present on the network. The initiating ISA also determines the extent to which the identified ISAs are available to support the search that is to be performed according to the search criteria.

Once other ISAs have been identified, the initiating ISA negotiates with the available ISAs to determine the extent to which each ISA may support the search that is to be conducted. The initiating ISA may negotiate with multiple supporting ISAs in series or parallel depending on the particular configuration and need of the initiating ISA.

Before, during, or after the negotiation between the initiating ISA and the supporting ISAs, the initiating ISA breaks the present search down into multiple search tasks that may be performed separately by the supporting ISAs. Once supporting ISA availability has been negotiated and search tasks have been identified, the search tasks are distributed to the supporting ISAs. The distribution of search tasks among the ISAs may involve varying levels of complexity. In a preferred embodiment that incorporates a simple distribution approach, search tasks may be distributed on a pure availability basis. That is, the initiating ISA distributes as much of the search as possible to the first available ISA and any remaining portions of the search are distributed to the next available ISAs, until the entire search is distributed.

Once the search tasks have been distributed, the search tasks are performed by the supporting ISAs. If the initiating ISA has retained any search tasks, the retained search tasks are also performed. In accordance with a preferred embodiment, the ISAs perform their search tasks independently of each other utilizing their own computer resources. In addition, the ISAs may perform their search tasks simultaneously with each other or at different times from each other. Search results generated by the supporting ISAs are reported back to the initiating ISA.

In accordance with a preferred embodiment, information identified by the search results is retrieved by the supporting ISAs, so that the search information can be more quickly and easily accessed by the user. That is, search results, including the actual Web pages, video files, graphics files etc., are downloaded from the Internet and stored by the supporting ISAs so that the information can be accessed by the person that initiated the search without having to connect to the source Internet server. In an embodiment, supporting ISAs may be selected at least partially based on the speed with which the supporting ISAs can download information from the Internet. The downloaded information may be pre-scanned for viruses and/or security risks before it is accessed by the user.

In another embodiment, distributed Internet searching may be coordinated through a master ISA that resides on a central server. The master ISA may distribute Internet searches to supporting-ISAs throughout an organization. The master ISA implementation works well in a distributed network architecture in which many users access the master ISA via a virtual private network (VPN). A master ISA may also be integrated with a corporate HTTP proxy so that Web sites fitting search criteria and/or commonly searched Web sites may be stored locally.

An advantage of distributed searching is that search tasks may be distributed in a manner that minimizes the impact on an intranet and its associated computers. Further, users that are remotely connected to an intranet may access the resources of the intranet by distributing search tasks to ISAs that may have, for example, more computing power and/or greater bandwidth availability. An advantage of implementing distributed searching via ISAs is that the ISAs function automatically in the background, requiring little or no action by the user after the initial setup.

DETAILED DESCRIPTION

Figure 1:
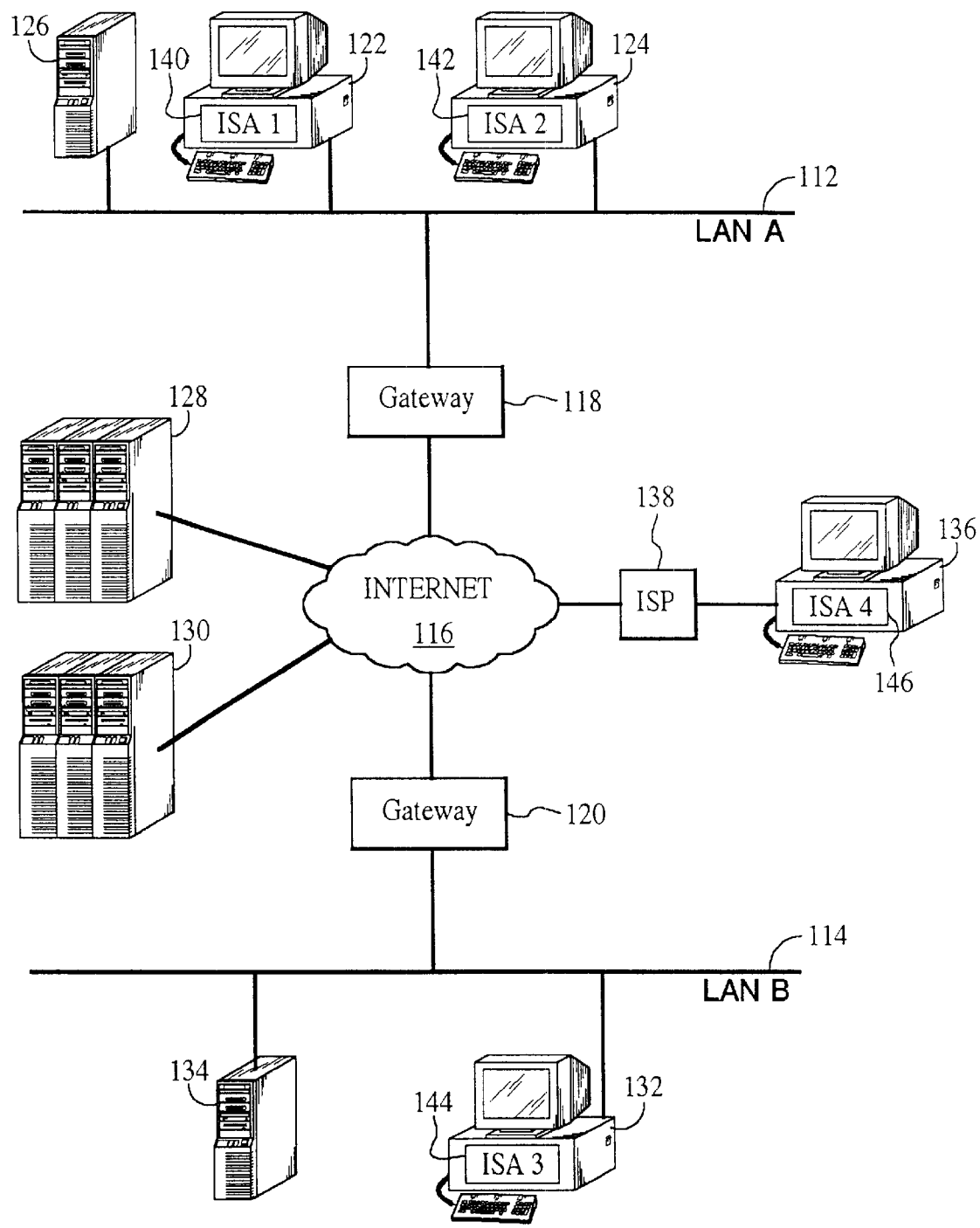
FIG. 1 is a depiction of an example network that may support distributed Internet searching in accordance with a preferred embodiment.

FIG. 1 is a depiction of an exemplary network that may support distributed Internet searching in accordance with a preferred embodiment. The network of FIG. 1 includes two LANs 112 and 114 that are connected to the Internet 116 by gateways 118 and 120. The first LAN 112 includes two terminals 122 and 124 and a server 126, although it should be understood that the first LAN could include any combination of devices found on a LAN. The second LAN 114 is connected to the Internet by the gateway 120 and includes a terminal 132 and a server 134, although it should be understood that the second LAN could include any combination of devices found on a LAN. The second LAN may be located close to the first LAN or the second LAN may be located, for example, on a different continent. It should be noted that although LAN architecture is described, other network architectures could be utilized. For example, the two LANs may be only part of a corporate intranet.

The Internet 116 includes multiple Web servers for hosting Web sites and two Web servers 128 and 130 are depicted for description purposes. Although Web servers are described, other Internet servers, such as Gopher servers, may be utilized. Other terminals, such as terminal 136 may also be connected to the Internet through, for example, an Internet service provider (ISP) 138. It should be noted that the network architecture depicted in FIG. 1 is for illustration purposes only and other network architectures such as wireless networks may be utilized with distributed Internet searching. In addition, it should be appreciated that while the Internet is disclosed in the present embodiment, in general, any one of a variety of networks may be used, such as an internal network or a specially created network.

In order to fully describe a preferred embodiment, it is necessary to describe the function of the Internet search applications, referred to herein as Internet search agents (ISAs) 140, 142, 144, and 146 that are accessible through the terminals 122, 124, 132, and 136, respectively. The ISAs are applications that are available to manage Internet searches. In accordance with a preferred embodiment, Internet searches may include many Internet searching techniques.

For example, Internet searches managed by the ISAs may utilize an Internet "spider" or "Web crawler", resident on the computer that accesses Internet sites searching for specified keywords. This is a resource intensive operation because each individual Internet site must be accessed to conduct the keyword search. In another example, the ISAs may accomplish Internet searching by accessing one or more commercial search engines, such as Yahoo, Excite, or Alta Vista. The commercial search engines utilize their own spider, or Web crawler, to go out on the Internet and retrieve as much information as possible. The retrieved information is then indexed and added to a searchable database that can be quickly and easily searched by anyone with access to the Internet. When utilizing a commercial search engine, search results are provided as links to the actual Internet sites where the information exists. Because search results are provided only as links to the source of the information, utilizing a commercial search engine does not typically consume a large amount of computer resources. In order for a user to utilize the information identified by a commercial search engine, the actual Internet site must be accessed and the data downloaded to the local computer, which may be a resource intensive operation.

The ISAs that are utilized to perform distributed Internet search and retrieval, are typically resident on desktop computers, although the ISAs may be accessible through a client/server architecture or some other user device such as a personal digital assistant (PDA). An ISA preferably enables a user to enter search parameters that are utilized to generate search criteria. Search criteria may include, for example, any combination of the following: what information should be searched for (e.g., topics of interest, keywords, etc.), where information should be searched (e.g., Web sites and Universal Resource Locators (URLs)), when information should be searched (e.g., immediately, lunch hour, nighttime, weekends, etc.), the frequency of searching (e.g., hourly, daily, weekly, etc.), bandwidth usage restrictions, and/or content restrictions (e.g., exclude pornography). When a user defines specific search parameters, the search parameters and search criteria may include basically the same information. Although some examples of search criteria are described by way of non-limiting example, other search criteria may be implemented.

In operation, a user utilizes an ISA to establish criteria for a particular search and then directs the ISA to manage the search according to the identified criteria. As described above, the ISA may utilize its own Internet "spider" to search the Internet, or the ISA may simply access a commercial search engine. Once the user has directed the ISA to manage the search, the ISA preferably moves into the background of the user's computer, freeing up the computer for other tasks. During operation, the ISA consumes various computing resources within the user's terminal, such as processor cycles and RAM. If the ISA is programmed to search immediately, the ability of the terminal to simultaneously perform other tasks may be hampered. If the ISA is programmed to perform an extensive Internet search and retrieval operation, the resources of the computer may be completely consumed. In order to free up the resources of the computer during working hours, the ISA may be programmed to perform the search and/or retrieval during off-peak hours. Although this may work in some situations, in other situations, the computer may not have the resources to perform the necessary searching and/or retrieving even during off-peak hours.

In order to ensure that the resources are available for an ISA to accomplish the requested searching and/or retrieving in an acceptable manner (e.g., in a reasonable amount of time, with a tolerable impact on network and computing resources) the ISA is programmed to break the search down into defined search tasks and then distribute the search tasks to other ISAs that have available resources. The other ISAs perform the distributed search tasks utilizing their own local computer resources and then report the results of the search tasks back to the ISA that initiated the search. The entire operation is performed automatically by the ISA. In addition, the ISA performs the entire operation in the background, such that the user is not required to interact with the ISA after the initial entering of search parameters.

Figure 2:
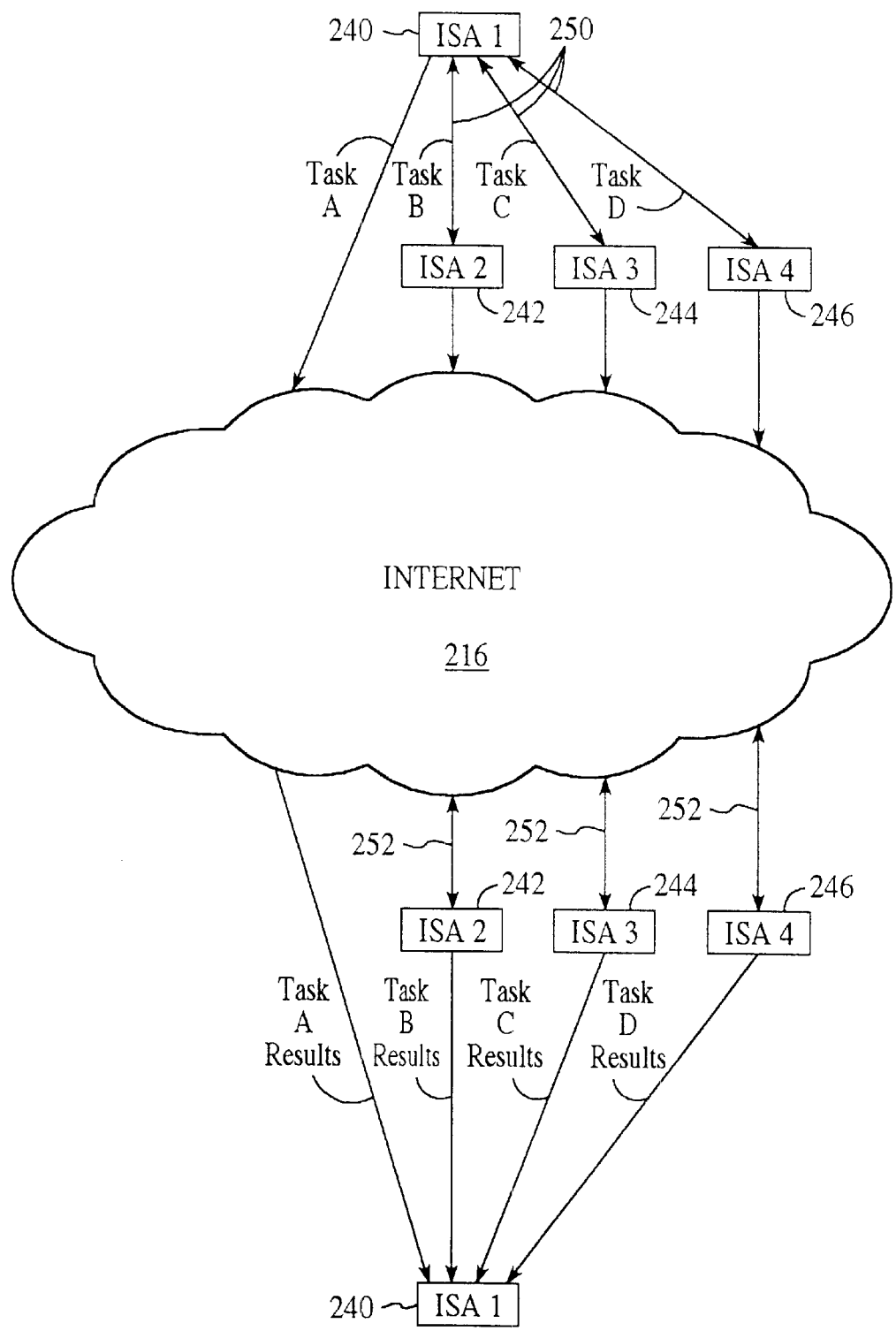
FIG. 2 is a graphical depiction of distributed Internet searching among an initiating ISA and three supporting ISAs in accordance with a preferred embodiment.
Figure 3:
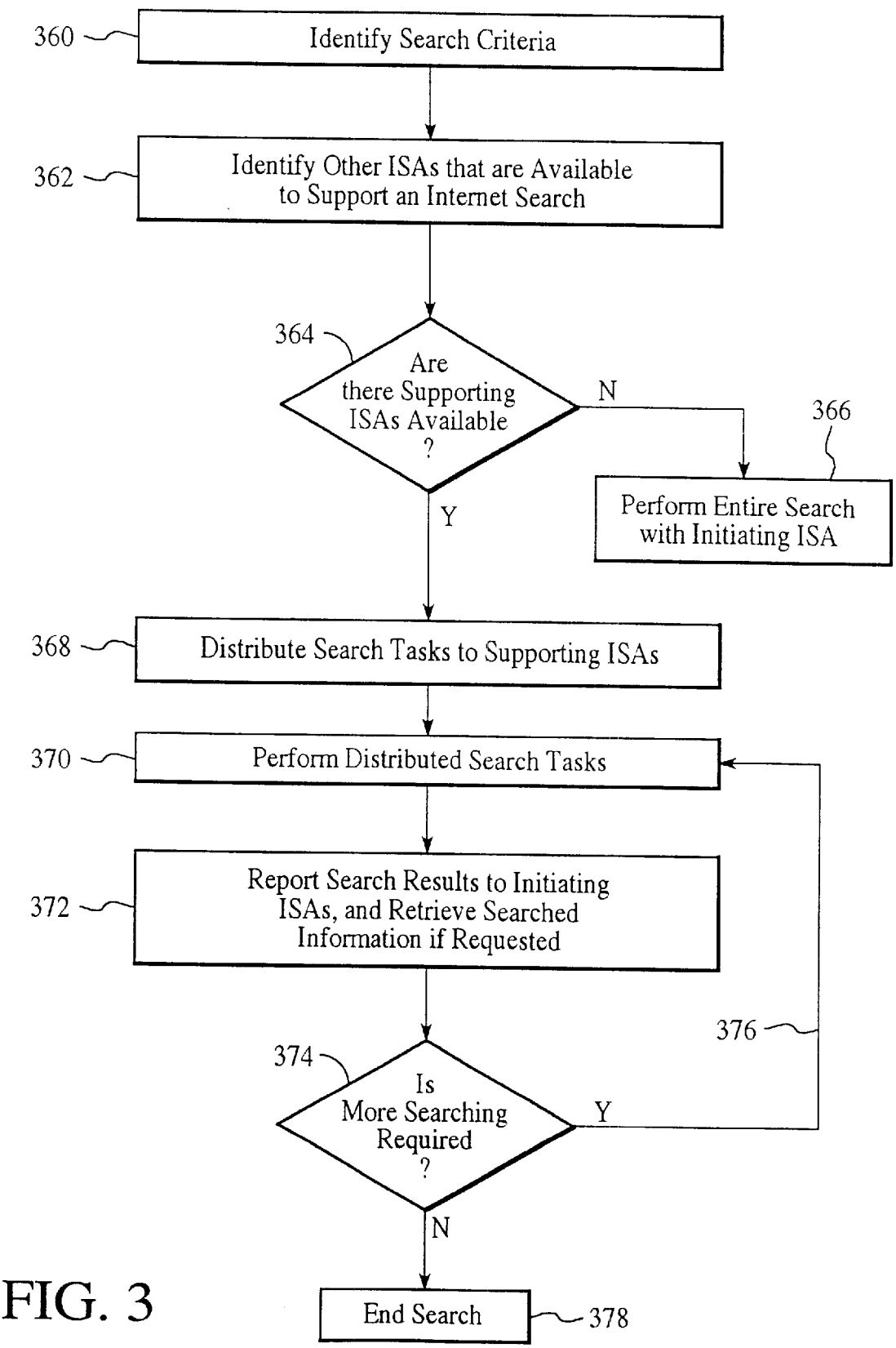
FIG. 3 shows steps for performing distributed Internet searching in accordance with a preferred embodiment.

FIG. 2 is a graphical depiction of distributed Internet searching among an initiating ISA and three supporting ISAs, all of which are depicted on FIG. 1. FIG. 3 is a process flow diagram representing a preferred method for performing distributed Internet searching. The process of Internet searching is described in detail below with reference to FIGS. 1–3. Referring to FIGS. 1 and 2, there are four ISAs, identified as ISA 1, ISA 2, ISA 3, and ISA 4 having reference numbers 140, 142, 144, and 146 in FIG. 1 and reference numbers 240, 242, 244, and 246 in FIG. 2. In the graphical depiction of FIG. 2, ISA 1 is the initiating ISA and ISAs 2, 3, and 4 are supporting ISAs.

Referring to FIG. 3, search criteria are identified (Step 360) to initiate a search. As described above, an initiating ISA may utilize user profile information to identify search criteria or search criteria may be entered manually by a user. For example, the user may identify that hiking and network security are topics of interest that should be searched. The initiating ISA may utilize the user profile to identify Internet sites that are to be searched or the user may identify particular Internet sites that are to be searched. The user may also program the initiating ISA to perform the search at a specific time, for example, during off-peak hours (e.g., 11pm to 5am), or after the user's computer has been inactive for a fixed period of time (e.g., after 15 minutes of inactivity). It should be appreciated that search criteria may be established in many different forms and may consist of many different types of information. The exact type and/or form of the search criteria is not critical to the invention and the fundamental requirement is that some search criteria has been established.

After the search criteria has been established, the initiating ISA, shown as ISA 1 in FIG. 2, identifies whether or not there are any other ISAs present on the network and the extent to which the ISAs are available to support the search (Step 362). The process of identifying the presence and availability of other ISAs may take many forms. For example, in one embodiment, communication between ISAs is coordinated by a central registration system and in another embodiment, communication between ISAs is coordinated through a broadcast system. In the central registration system, ISAs register with a central registration server that maintains a register of all ISAs. The information maintained by the central registration server may range from a minimum level of information (e.g., the identity of each ISA or the physical location of each ISA) to a high level of information (e.g., the identity of each ISA, the hours of availability of each ISA, the bandwidth available to each ISA, and/or the Web sites currently being cached by each ISA). When the central registration server provides a minimum level of information about other ISAs, the initiating ISA may use the registration system simply to identify the presence of other ISAs. The initiating ISA then negotiates directly with each identified ISA to establish the level of support that the ISAs may provide to the initiating ISA. When the central registration server provides a high level of information about other ISAs, the initiating ISA may be able to negotiate the level of ISA support directly through the central registration server.

In the broadcast system, the initiating ISA may rely on broadcasts from other ISAs on the network to establish the presence of other ISAs. For example, each ISA may periodically broadcast a signal identifying the ISA as available to the other ISAs on the network. Each ISA may maintain its own register of available ISAs and can then contact the available ISAs directly when a search is initiated. In a hybrid between the centralized registration system and the broadcast system, individual ISAs may register with a central registration server and then the central registration server may broadcast availability information to all ISAs on the network. As mentioned above, the process of identifying the presence and availability of ISAs may be accomplished by many techniques and the examples described are not meant to limit the techniques that may be implemented.

Once other ISAs have been identified, the initiating ISA determines the extent to which the available ISAs may support the search that is to be conducted. The level of support that may be provided by supporting ISAs may be established by the individual user of the computer on which the supporting ISA resides. Alternatively, availability profiles may be generated and controlled by a single entity, such as a corporate information technology (IT) department. In an embodiment, the initiating ISA negotiates directly with each supporting ISA in order to determine the level of support that each ISA may provide. Referring to FIG. 3, if there are no ISAs available to support the initiating ISA (Decision Step 364), the initiating ISA performs the search on its own, as indicated in Step 366. The initiating ISA may negotiate with multiple supporting ISAs in series, or the initiating ISA may negotiate with the supporting ISAs in parallel depending on the particular configuration and need of the initiating ISA. Referring to FIG. 2, the negotiation process between the initiating ISA (ISA 1) and the supporting ISAs (ISAs 2, 3, and 4) is depicted with the bi-directional arrows 250. Although three supporting ISAs are shown in FIGS. 1 and 2 and described in the example, distributed Internet searching may be conducted between an initiating ISA and a single supporting ISA. In addition, although in one embodiment, the identification and negotiation process occurs after search criteria is established, in other embodiments, the identification and negotiation process may occur before or during the establishment of search criteria.

Before, during, or after the negotiation between the initiating ISA (ISA 1) and the supporting ISAs (ISA 2, ISA 3, and ISA 4), the initiating ISA may break the present search down into multiple search tasks that may be performed separately by the supporting ISAs. A search task may take many forms and in one embodiment, a search task identifies the keywords that should be used in the search along with the particular Web sites that should be searched. For example, a first supporting ISA may receive a first search task directing the ISA to search Web sites A, B, and C using an Internet "spider," searching for specified keywords. In a preferred embodiment, each search task is unique such that searching efforts are not duplicated by different ISAs. When multiple search tasks are generated, a second supporting ISA may receive a second search task, different from the first search task, directing the second ISA to search Web sites D, E, and F using the same specified keywords. Although the keywords are same, the two search tasks call out different Web sites. In a preferred embodiment, a search task may direct a supporting ISA to utilize one or more commercial search engines to perform a search based on specified keywords.

Once supporting ISA availability has been negotiated and search tasks have been identified, the search tasks are distributed by the initiating ISA to the supporting ISAs (Step 368). FIG. 2 depicts the distribution of search tasks B, C, and D from the initiating ISA, ISA 1, to the supporting ISAs, ISA 2, ISA 3, and ISA 4, respectively. Distributing search tasks may involve transferring files containing the search criteria to the supporting ISAs. FIG. 2 also shows that a search task A is retained for performance by ISA 1. As with the negotiation process, the distribution of search tasks may be performed in series or in parallel. Although FIG. 2 represents that ISA1 has retained a search task, in other embodiments, the initiating ISA may distribute all of the search tasks to the supporting ISAs. Similarly, although in FIG. 2 the initiating ISA distributes the search tasks among three supporting ISAs, the search tasks, or search task, may be distributed to more than three supporting ISAs or to only one supporting ISA.

Although not shown in FIGS. 2 and 3, the distribution of search tasks among the ISAs may involve varying levels of complexity. In a simple distribution approach, search tasks may be distributed on a pure availability basis. That is, the initiating ISA distributes as much of the search as possible to the first available ISA and any remaining portions of the search are distributed to the next available ISAs until the entire search is distributed. In more complex distribution approaches, intelligent algorithms may be implemented in a manner that causes search tasks to be distributed more efficiently. For example, search tasks may be distributed geographically such that an ISA that is located in Europe receives the task of searching Web sites that are located in Europe. This approach is especially advantageous when search and retrieval operations are being performed because retrieving information to local computers may provide a time savings. If the ISAs are connected by a high speed intranet, then overall downloading time for the initiating ISA can be minimized.

Search tasks may be distributed to ISAs having some special knowledge or expertise in searching particular topics and/or Web sites. For example, a supporting ISA may have built up its own Internet search database on a particular topic that may be helpful in the search. When searching and retrieving is requested by the initiating ISA, search tasks may be distributed in view of bandwidth considerations such that searches requiring high bandwidth may be performed by ISAs having comparable bandwidth capacity. Other intelligent algorithms may consider search parameters such as required time windows for conducting a search (e.g., matching a required time window to an available time window), search priority (e.g., low, medium, high, and urgent searches), and/or user lists (e.g., restricting use of a particular ISA to certain other ISAs).

Another intelligent algorithm for distributing search tasks takes into consideration searches that are currently being performed by the supporting ISAs and/or searches that have previously been performed by the supporting ISAs. If a supporting ISA is in the process of performing another search or search and retrieval operation when contacted by an initiating ISA, search tasks that include Web sites which are already on the list of the supporting ISA may be transmitted to the supporting ISA. Preferably, the supporting ISA is only assigned new search tasks related to Web sites that have not yet been searched. The supporting ISA then searches the assigned Web site utilizing two sets of search criteria rather than requiring two ISAs to connect to the same Web site. In another example, if a supporting ISA has previously performed a relevant search and retrieval, the initiating ISA may be able to find relevant information locally at the supporting ISA. In addition, certain ISAs in the network may, over time, develop particular knowledge that may be helpful to an initiating ISA.

Once the search tasks have been distributed, the search tasks are performed by the ISAs (Step 370). As shown in FIG. 2, ISAs access the Internet 216 and perform their search tasks independently of each other utilizing their own computer resources. The initiating ISA 240 and the supporting ISAs 242, 244, and 246 may perform their search tasks simultaneously or at different times. For example, ISAs 2 and 3 may perform their search tasks simultaneously, while ISA 4 performs its search task at a different time because, for example, ISA 4 is located in a different time zone where computer usage patterns differ from the time zones of ISAs 2 and 3.

As depicted in FIGS. 2 and 3, search results generated by supporting ISAs are reported back to the initiating ISA (Step 372). In addition, information identified by the search may be retrieved by the supporting ISA if requested by the initiating ISA. The timing and content of search results reporting requires no particular format and may be customized as needed. The timing of search results reporting may be established, for example, on a task basis or a timing basis. On a task basis, supporting ISAs can be directed to report to the initiating ISA upon completion of each identified search task. On a timing basis, supporting ISAs may be directed to report to the initiating ISA on an hourly, daily, weekly, or other fixed interval basis. Alternatively, the supporting ISAs may be programmed to report search results only when prompted by the initiating ISA. The content of search results reporting may be established, for example, based on a correlation value (e.g., hit percentage) or a priority basis (e.g., report network security information before hiking information). In a preferred embodiment, search results are provided as hyperlinks to Internet content that fits the search criteria. For example, the hyperlinks may relate to Internet content, such as text, graphics, video, audio, etc.

In a preferred embodiment, the Internet content (e.g., text, graphics, video, audio, etc.) identified by an Internet search is retrieved by the supporting ISAs in order to make the searched information readily available to the user. That is, search information, such as the actual Web pages, may be downloaded and stored by the supporting ISAs so that the information can be accessed by the person that initiated the search without having to connect to the Internet server that is the source of the content. Having the supporting ISAs retrieve the information identified by a search enables the bandwidth consumption to be distributed among more than one computer. In addition, if the initiating and supporting ISAs are connected by a high speed intranet, the downloaded Internet content can be more quickly and easily accessed by the initiating user. Information that is retrieved by the supporting ISAs may be pre-scanned for viruses and/or security risks before it is accessed by the user.

Depending on the search task and the reporting criteria that have been established by the initiating ISA, searching, retrieving, and reporting may be a continuous process. If more searching is required (Decision Step 374), then the process of searching, retrieving, and reporting is repeated as depicted by logic loop 376 in FIG. 3 and the bi-directional arrows 252 in FIG. 2. If no more searching is required, then the search task is complete and/or the search is ended (Step 378).

User access to the search results (e.g., hyperlinks and/or actual Internet content) may be customized to fit a user's particular needs. For example, search results may be pushed from the supporting ISAs to the initiating ISA or search results may be maintained at the supporting ISAs until the user fetches the results from the supporting ISAs. In addition, the user may choose to view which sites have already been searched, what percentage of the search is complete, an estimate of completion time, geographical breakdowns of search results, breakdowns of search completion percentages by search agent, average activity, and/or search categories.

In another embodiment, distributed Internet searching may be coordinated through a master ISA that resides on a central server. The master ISA may distribute Internet searches throughout an organization to supporting ISAs. The master ISA implementation works well in a distributed network architecture in which many users access the master ISA via a virtual private network (VPN). The master ISA may also be integrated with a corporate HTTP proxy so that Web sites fitting search criteria to a high degree of accuracy and/or commonly searched Web sites may be stored locally.

Whether or not the master ISA embodiment is implemented, users connecting to an intranet via a VPN connection may take advantage of greater bandwidth and computing resources that are available on the intranet to perform resource intensive searches. When an initiating ISA is connected to supporting ISAs through an ISP, search results may be cached locally at the ISP so that the searched information may be quickly accessed by the end user.

Distributed Internet searching may also be integrated with known helpdesk applications by utilizing work tickets to transmit search requests to a master ISA. All of the criteria for a particular search may be entered into a work ticket and sent via electronic mail to the helpdesk where an API allows the helpdesk application to communicate directly with a master ISA.

Figure 4:
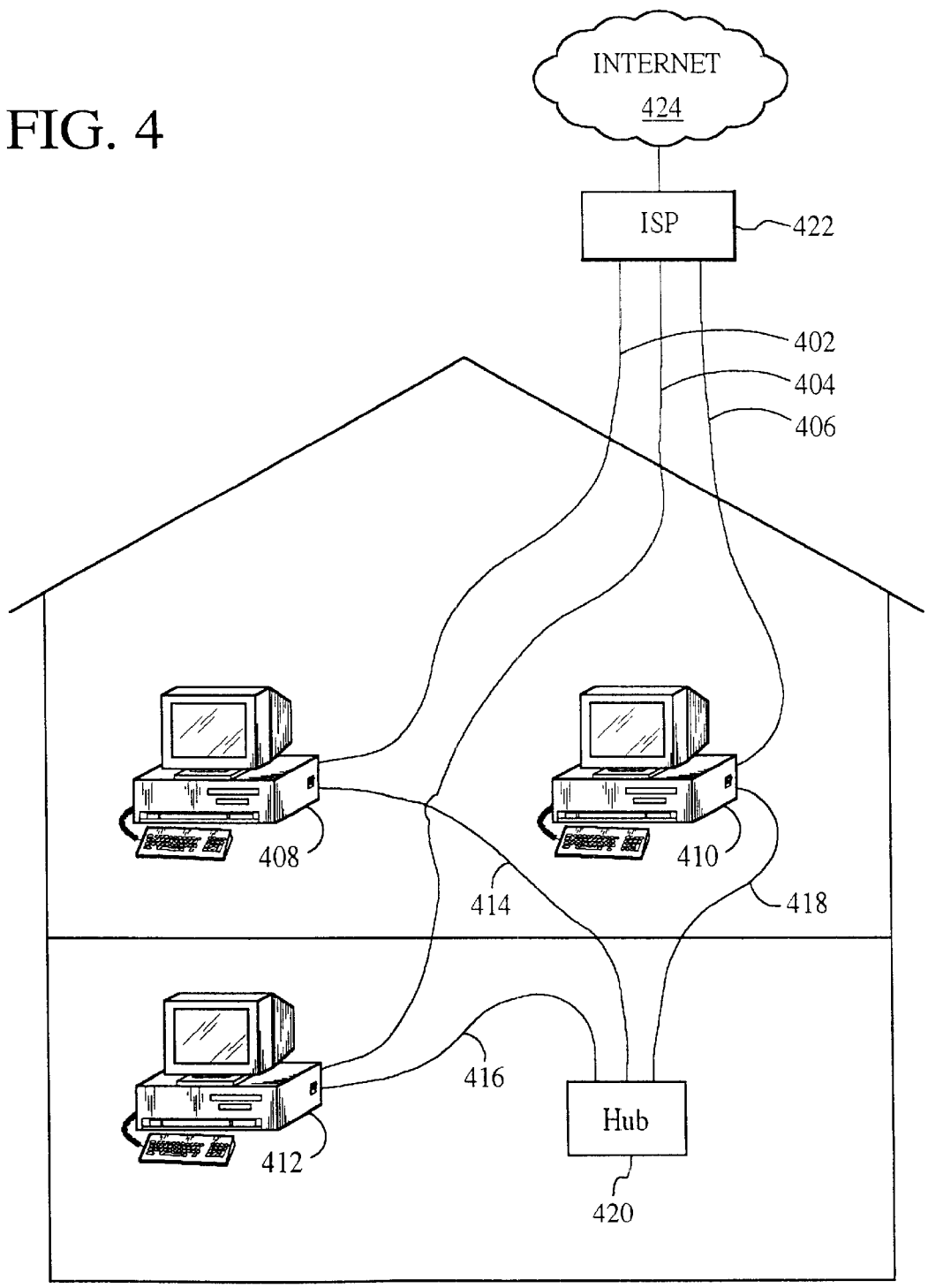
FIG. 4 shows a configuration of an exemplary computing environment in which distributed Internet searching and retrieval may be achieved in accordance with a preferred embodiment.

FIG. 4 shows a configuration of an exemplary computing environment in which distributed Internet searching and retrieval may be achieved in accordance with a preferred embodiment. In the example, a household has three telephone lines 402, 404, and 406, three computers 408, 410, and 412 (one each for three users, User 1, User 2, and User 3), and three connections to an ISP 427. In addition, the household has an internal network, such as a low-cost 10-base-T network that connects three computers. The internal network may include low cost 10-base-T network interface cards, twisted pair wire connections 414, 416, and 418, and a low-cost 10-base-T Ethernet hub 420. A problem in the prior art is that if User 1 wants to utilize a computer 408 to download, for example, two-hundred pictures of U.S. Presidents for a school project, User 1 may be limited by a slow Internet connection during the downloading of the pictures. If User 1 utilizes an ISA to sequentially search the Internet, the user is still limited by the bandwidth of the user's ISP connection. As a result, searching numerous Internet sites and downloading two-hundred pictures may take several hours. In the meantime, however, User 2 and User 3 have computers 410 and 412 with connections to the Internet 424 that are not being utilized at the present time.

Figure 5:
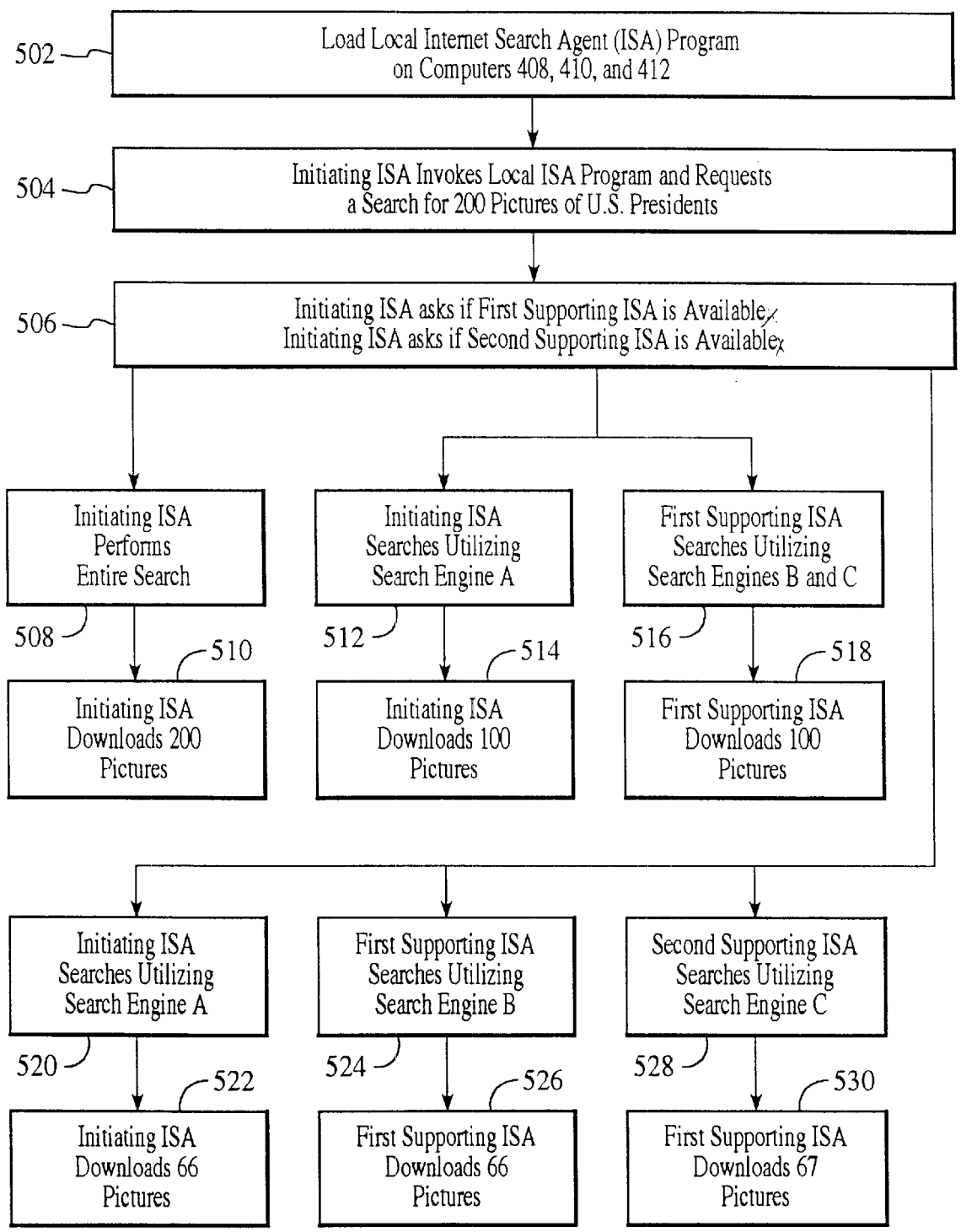
FIG. 5 shows steps for performing distributed Internet searching in the computing environment of FIG. 4 in accordance with a preferred embodiment.

FIG. 5 shows steps taken by an initiating ISA to perform distributed searching and retrieval with the network of FIG. 4 in accordance with a preferred embodiment. At step 502, at startup time, a local program, for example "ISA.exe" is executed at each computer. The computers communicate with each other over the internal network using methods known in the art. At step 504, User 1 enters a search request for U.S. Presidents into its ISA. At step 506, ISA 1 (User 1's ISA) asks ISA 2 and ISA 3 if they are available to help ISA 1 perform a search. If ISA 2 and ISA 3 are not available, then steps 508 and 510 of searching and downloading by ISA 1 alone are carried out. ISA 1 may perform its search by accessing commercial search engines or by searching specific Internet sites itself utilizing an Internet "spider." However, if ISA 2 is available, then, advantageously, ISA 1 distributes some search tasks to ISA 2 (Steps 516 and 518) and can maintain some search tasks (Steps 512 and 514). The distribution of search tasks may involve utilizing different commercial search engines to perform the search and retrieval operation.

If ISA 3 is also available, then the search and retrieval tasks are split among three computers (Steps 520, 522, 524, 526, 528, and 530) and the time required to search and retrieve the desired information is reduced by one-third. After downloading, the disired information may be transferred to User 1's computer 408, or stored on another computer that acts as a server.

Because of the widespread use of the Web, distributed searching is primarily described in terms of Web searching. However, distributed searching is equally applicable to other network protocols, especially other IP-based protocols such as FTP, Gopher, Telnet, etc.

What is claimed is:

1. A method for searching the Internet by accessing more than one commercial search engine, comprising:

generating search criteria for an Internet search utilizing a first Internet search agent that is resident on a first computer, said search criteria being generated based on a user profile indicating a time when said Internet search is to be performed;

said search criteria indicating what information is to be searched and restrictions as to how much information is to be retrieved;

dividing said search criteria into a plurality of distinct search tasks;

identifying a plurality of second Internet search agents that are resident on a plurality of other computers to support said first Internet search agent in performing said distinct search tasks;

said identification of said second Internet search agents being restricted based on a user, said identification further including receiving periodic broadcasts from said second Internet search agents;

directing each of said second Internet search agents to perform at least one of said distinct search tasks based on an availability, a bandwidth capacity, a time window, a search priority, a user list, and a geographic location of said second Internet search agents, utilizing at least one associated commercial search engine;

each of said distinct search tasks being performed at said commercial search engine utilizing said associated directed second Internet search agent;

performing at least one of said distinct search tasks utilizing said first Internet search agent;

receiving reporting results in a prioritized manner from said performance of said distinct search tasks, said reporting results further including an indication of a percentage of said Internet search that is complete, a geographical breakdown of said reporting results, and an estimate of a completion time;

breaking down said reporting results based on said second Internet search agent that provided said reporting results; and displaying said broken down reporting results.

* * * * *